(12) United States Patent
Hoppe et al.

(10) Patent No.: US 11,214,399 B1
(45) Date of Patent: Jan. 4, 2022

(54) MULTI-COMPARTMENT BOTTLE

(71) Applicant: HopOver Ventures LLC, Anthem, AZ (US)

(72) Inventors: Kevin A. Hoppe, Anthem, AZ (US); Peter A. Grover, Anthem, AZ (US)

(73) Assignee: HopOver Ventures LLC, Anthem, AZ (US)

( * ) Notice: Subject to any disclaimer, the term of this patent is extended or adjusted under 35 U.S.C. 154(b) by 215 days.

(21) Appl. No.: 16/521,540

(22) Filed: Jul. 24, 2019

(51) Int. Cl.
*B65D 1/04* (2006.01)
*B65D 47/06* (2006.01)
*B65D 25/48* (2006.01)

(52) U.S. Cl.
CPC .............. *B65D 1/04* (2013.01); *B65D 25/48* (2013.01); *B65D 47/065* (2013.01); *B65D 2547/063* (2013.01)

(58) Field of Classification Search
CPC ...... B65D 47/061; B65D 47/06; B65D 25/46; B65D 25/44; B65D 25/42; B65D 25/40; B65D 5/746; B65D 5/74; B65D 1/04; B65D 47/065; B65D 25/48; B65D 2547/063; B65D 47/063; B65D 25/04
See application file for complete search history.

(56) References Cited

U.S. PATENT DOCUMENTS

| | | | |
|---|---|---|---|
| 279,216 A | 6/1883 | Berlien | |
| 896,903 A | 8/1908 | Ferry | |
| 1,240,072 A | 9/1917 | Maiden | |
| 2,298,655 A | 10/1942 | Segerlund | |
| 2,374,092 A | 4/1945 | Michael | |
| 2,979,238 A * | 4/1961 | Bramming | A47G 21/18 222/484 |
| 3,089,626 A * | 5/1963 | Kubiliunas | B65D 47/305 222/484 |
| 3,469,739 A | 9/1969 | Phillips | |
| 3,776,428 A * | 12/1973 | Hazard | B65D 47/305 222/153.09 |
| 3,957,181 A * | 5/1976 | Hazard | B65D 47/305 222/534 |
| 4,015,756 A * | 4/1977 | Beck | B65D 47/305 222/534 |
| 4,282,991 A * | 8/1981 | Hazard | B65D 47/26 222/531 |
| 4,519,529 A | 5/1985 | Seitz | |
| 4,732,303 A | 3/1988 | Wang | |
| 5,797,521 A * | 8/1998 | Sobral | B65D 47/305 222/484 |

(Continued)

*Primary Examiner* — Kareen K Thomas
(74) *Attorney, Agent, or Firm* — Thomas W. Galvani, P.C.; Thomas W. Galvani

(57) ABSTRACT

A multi-compartment bottle includes an upper compartment having a bottom, an open mouth opposite the bottom, and a sidewall cooperating with the bottom to bound an internal reservoir. A lid is fit to the open mouth to enclose the internal reservoir. The bottle further includes a lower compartment separate from the upper compartment, having a base, an open top opposite the base, and a wall cooperating with the base to bound an internal chamber. The bottom of the upper compartment is applicable to the open top of the lower compartment to enclose the internal chamber. The lower compartment includes engagement structures which extend into the internal chamber from the wall to define a hold in the lower compartment.

18 Claims, 9 Drawing Sheets

(56) References Cited

U.S. PATENT DOCUMENTS

| | | | |
|---|---|---|---|
| 6,405,675 B1 | 6/2002 | Mills | |
| 8,459,502 B2 * | 6/2013 | Swanick | B65D 47/32 |
| | | | 222/83 |
| 8,544,685 B2 * | 10/2013 | Swanick | B65D 51/222 |
| | | | 222/83 |
| 8,887,968 B1 | 11/2014 | Call | |
| 9,010,952 B2 | 4/2015 | Lenahan et al. | |
| 2012/0261375 A1 * | 10/2012 | Loging | B65D 81/3227 |
| | | | 215/11.4 |
| 2013/0200074 A1 * | 8/2013 | Moriyama | B65D 15/08 |
| | | | 220/270 |
| 2017/0320640 A1 * | 11/2017 | Steinmann | B65D 47/0828 |

* cited by examiner

MULTI-COMPARTMENT BOTTLE

FIELD OF THE INVENTION

The present invention relates generally to drinkware, and more particularly to portable beverage containers.

BACKGROUND OF THE INVENTION

Many people like to drink beverages while on the go. Beverages are often carried by people for different reasons and to different places, such as to the beach, to the office, in the car, on a boat, at the golf course, at the shopping mall, and other similar places. Currently, insulated bottles, such as tumblers, are quite popular for carrying water, coffee, smoothies, and the like. People of all ages carry these items to keep hydration nearby.

Such insulated bottles are typically meant for personal use, not to be shared. However, sometimes several people wish to use a single bottle without "swapping spit." Most bottles, however, require the drinker to place his or her lips or mouth on a straw or an opening to drink from the bottle. This not only prevents the risk of contaminating the drinking straw or opening, but also the risk that liquid from the drinker's mouth will spill back into the bottle at the conclusion of a drink. As such, an improved way to share a single bottle is needed.

SUMMARY OF THE INVENTION

A multi-compartment bottle includes an upper compartment having a bottom, an open mouth opposite the bottom, and a sidewall cooperating with the bottom to bound an internal reservoir. A lid is fit to the open mouth to enclose the internal reservoir. The bottle further includes a lower compartment separate from the upper compartment, having a base, an open top opposite the base, and a wall cooperating with the base to bound an internal chamber. The bottom of the upper compartment is applicable to the open top of the lower compartment to enclose the internal chamber. The lower compartment includes engagement structures which extend into the internal chamber from the wall to define a hold in the lower compartment.

The above provides the reader with a very brief summary of some embodiments discussed below. Simplifications and omissions are made, and the summary is not intended to limit or define in any way the scope of the invention or key aspects thereof. Rather, this brief summary merely introduces the reader to some aspects of the invention in preparation for the detailed description that follows.

BRIEF DESCRIPTION OF THE DRAWINGS

Referring to the drawings.

DETAILED DESCRIPTION

Figure 1:
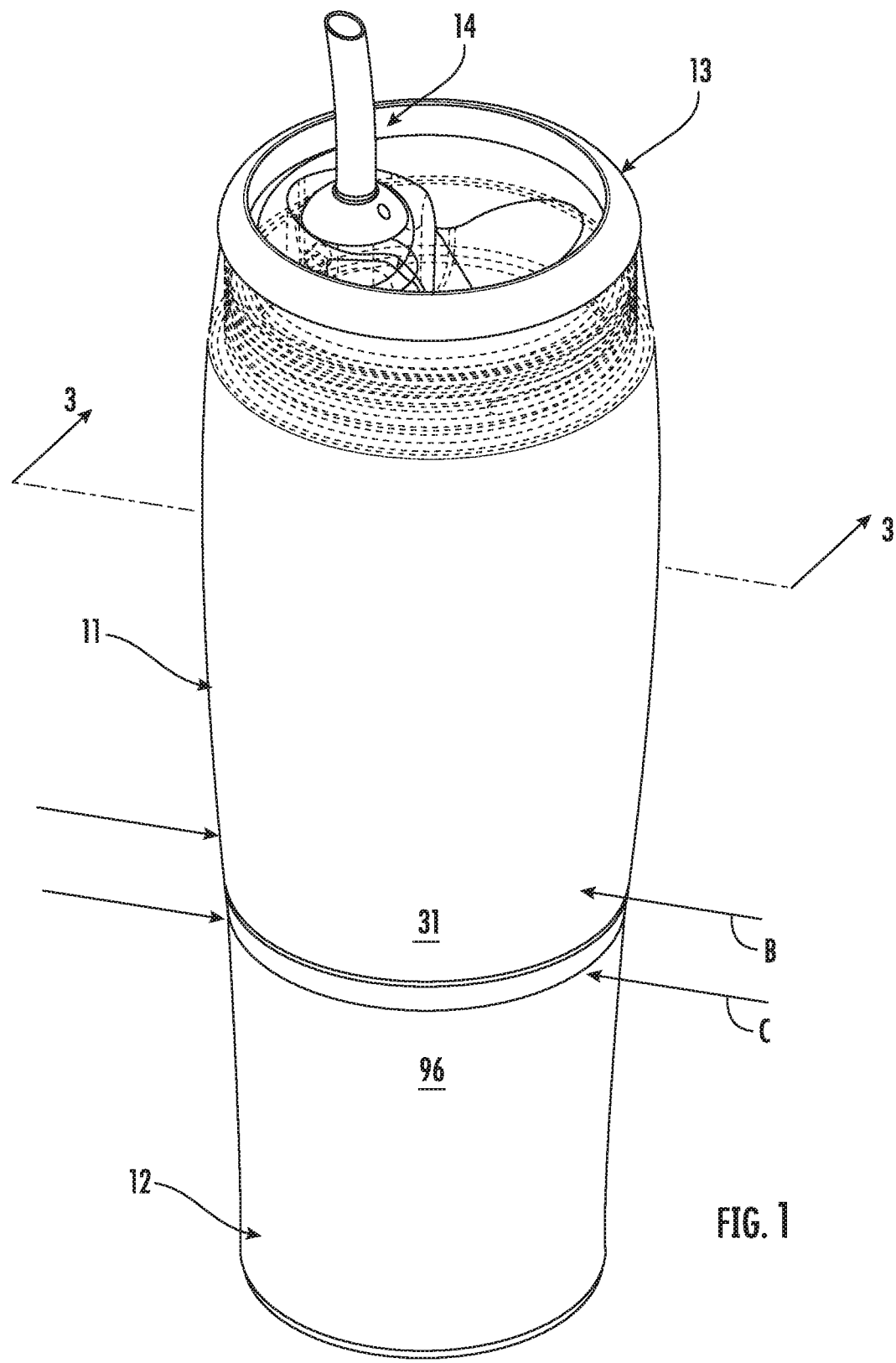
FIGS. 1 and 2 are top perspective and exploded top perspective views of a multi-compartment bottle.

Reference now is made to the drawings, in which the same reference characters are used throughout the different figures to designate the same elements. FIG. 1 illustrates a multi-compartment bottle 10 (hereinafter, "bottle" 10) having an upper compartment 11 fit with a lid 13, and a lower compartment 12 applied to the upper compartment 11. The lid 13 includes a spout assembly 14 for dispensing a liquid or other contents from the upper compartment 11, especially into the lower compartment 12, or into a container, cup, or other receptacle carried within the lower compartment 12. The bottle 10 is preferably insulated, so that it keeps the contents of the upper compartment 11 hot or cold, as the owner of the bottle 10 desires.

Figure 2:
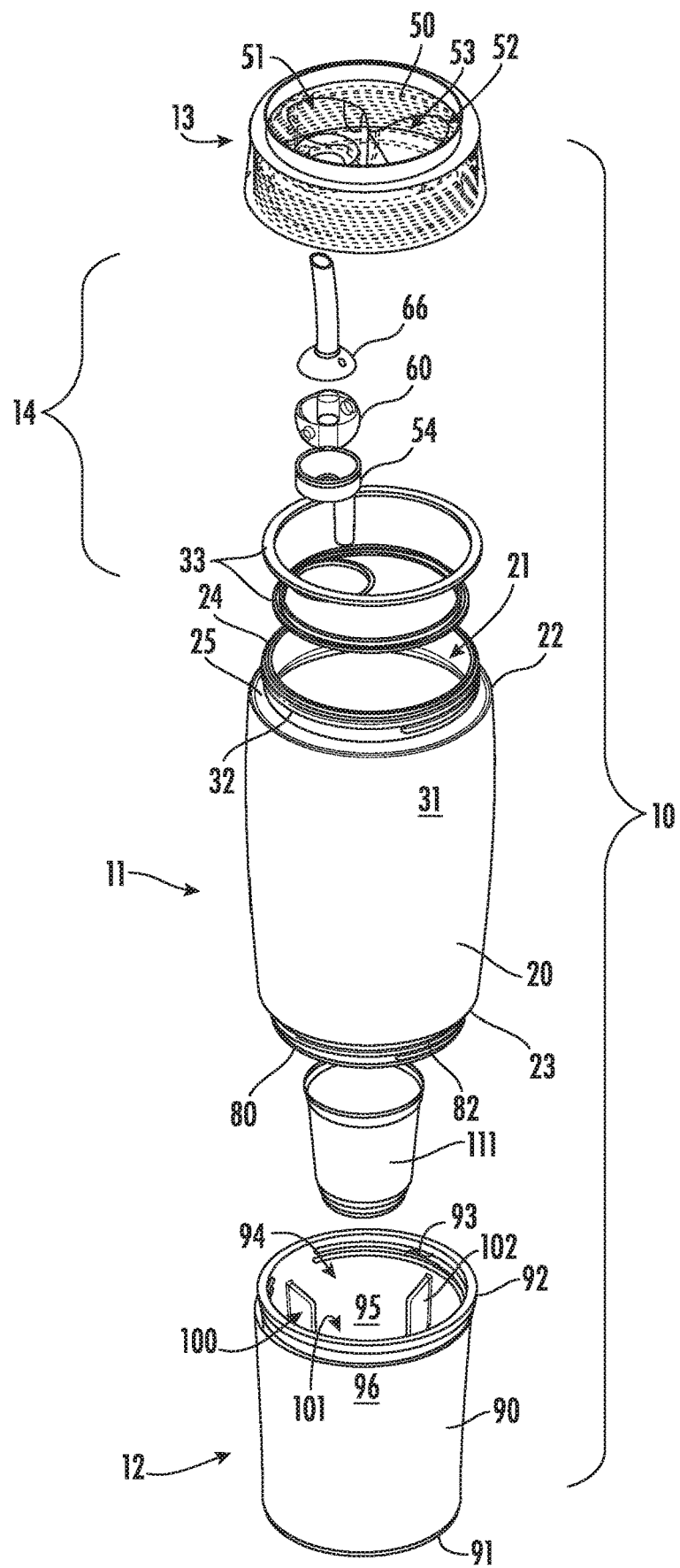

FIG. 2 is an exploded view of the bottle 10, showing that the upper compartment 11 has an annular sidewall 20 extending between an open mouth 21 at the top 22 of the sidewall 20 and a closed bottom 23 opposite the top 22 of the sidewall 20. As such, the sidewall 20 defines the upper compartment 11 as a generally cylindrical body, open at the top 22 and available to receive and hold or cold liquid contents.

At the top 22 of the upper compartment 11, an upstanding lip 24 projects upwardly as a continuation of the sidewall 20, to which it is formed integrally and continuously. The lip 24 is offset radially inward from the sidewall 20 by a flat, annular shoulder 25 projecting radially inward. The shoulder 25 is located at the top 22 of the sidewall 20, and the lip 24 projects above this top 22. The lip 24 thus defines the mouth 21 as an entrance to an internal reservoir 26 (shown better in FIG. 3) within the upper compartment, wherein the internal reservoir 26 is bound by the sidewall 20, the mouth 21 at the top 22, and the bottom 23. The sidewall 20 is preferably formed of two walls or layers, with an air space disposed between, to provide insulative characteristics to the upper compartment 11.

Figure 3:
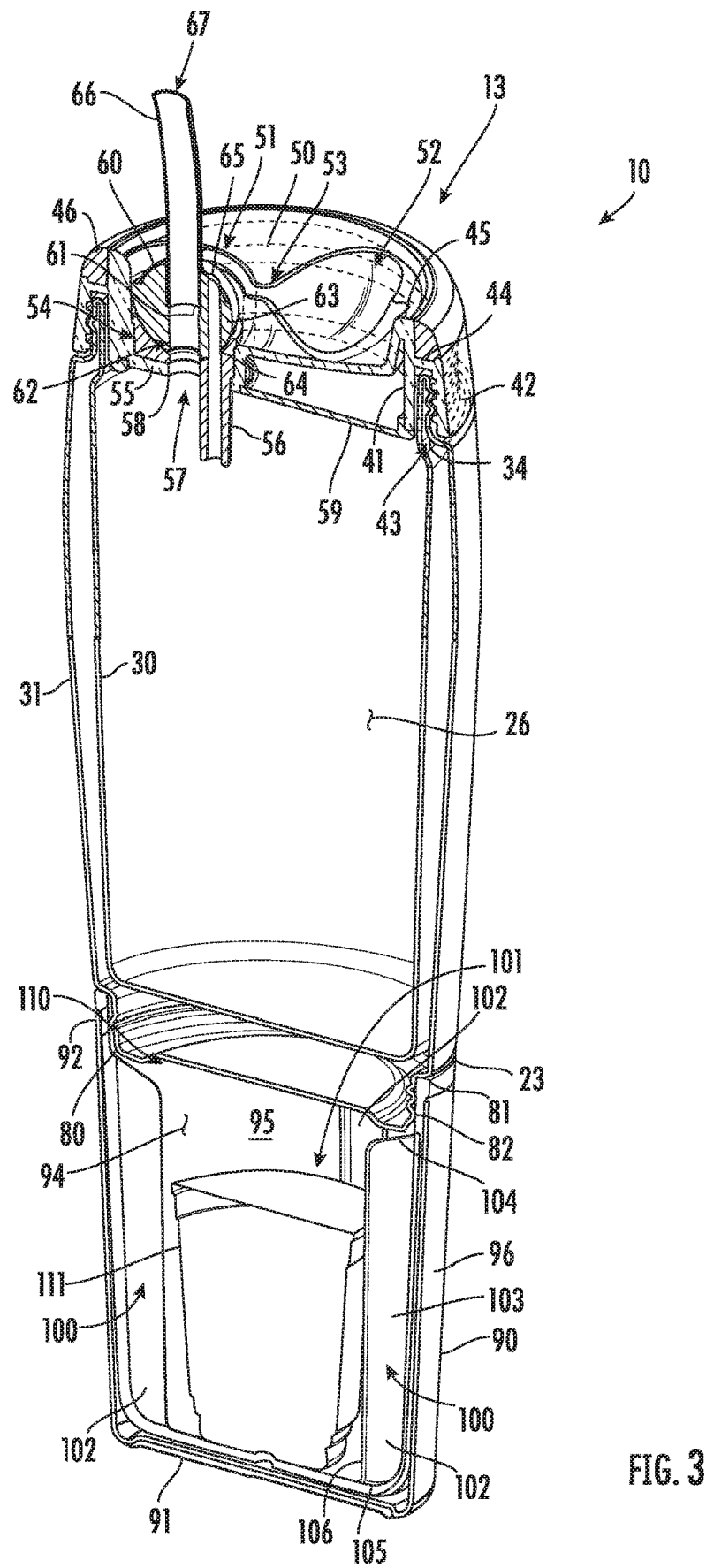
FIG. 3 is a section view of the multi-compartment bottle of FIG. 1, taken along the line 3-3 in FIG. 1.

The sidewall 20 of the upper compartment 11 has an inner surface 30 and an opposed outer surface 31, as seen in FIG. 3. The outer surface 31 projects outwardly, while the inner surface 30 projects inwardly. The inner surface 30, therefore, bounds the internal reservoir 26. Moreover, the inner surface 30 is smooth, continuous, and generally without interruptions or discontinuities, while the outer surface 31 is formed with features. For example, the outer surface 31 at the lip 24 is formed with outwardly-directed threads 32 encircling the lip 24. These threads 32 engage with complemental threads 34 formed on the lid 13.

A set of gaskets 33 disposed between the upper compartment 11 and the lid 13 seals the lid 13 to the upper compartment 11 when it is tightly secured thereon, thereby sealing and enclosing the internal reservoir 26. Referring now to FIG. 3, the lid 13 includes an annular base 40 having a first, inner sidewall 41 and a second, outer sidewall 42 formed to each other and spaced apart by a socket 43. Briefly, portions of the lid 13 are shown in broken line; these illustrate structural elements and features within or behind transparent structures. The inner and outer sidewalls 41 and 42 are each annular, extending continuously around the lid 13, and as such, the socket 43 is also annular. The inner and outer sidewalls 41 and 42 are connected by a shoulder 44 projecting radially outward from the inner sidewall 41 to a top of outer sidewall 42. The inner and outer sidewalls 41 and 42 have coextensive lower edges, and the annular socket 43 thus opens upward from between those lower edges, extending upward to the shoulder 44. The outer sidewall 42 extends only downwardly from the shoulder 44, while the inner sidewall 41 extends both downwardly and upwardly therefrom. The inner sidewall 41 extends upwardly to a top 45 of the base 40, which is above and radially inset from the shoulder 44, forming an annular notch into which an annular guard 46 is set.

From the top 45, the lid 13 has a curved upper 50 extending just below but across the top 45. The upper 50 is formed with a cylindrical depression 51, an oval depression 52, and a channel depression 53 extending from the cylindrical depression 51 to the oval depression 52. Each of the depressions 51-53 are integral depressions of the upper 50 downward toward the internal reservoir 26. The cylindrical depression 51 seats the spout assembly 14, which moves between a lowered or closed position and a raised or opened position. In the closed position, the spout assembly 14, still seated in the cylindrical depression 51, extends across the upper 50 through the channel depression 53 and is flanked by the oval depression 52. The oval depression 52 flanks the channel depression 53 such that, when the spout assembly 14 is in the closed position thereof with the spout in the channel depression 53, the user can slip his or her fingers into the oval depression 52 under the spout and lift it.

The cylindrical depression 51 is applied with an insert 54 that converts it into a semi-spherical depression in which the spout assembly 14 can not only be seated but pivot. The insert 54 includes a concave seat 55 on one side, and a depending vent tube 56 on the other. Between the seat 55 and the vent tube is a bore 57 formed entirely through the insert 54. A complemental bore 58 is also formed through the base 40, coextensive and registered with the bore 57.

The concave seat 55 is a smooth, concave, surface shaped to cradle the spout assembly 14. The vent tube 56 depends below the seat 55 and the bores 57 and 58, into the internal reservoir 26. The vent tube 56 is hollow and has an open top and open bottom, such that it is coupled in fluid communication with the internal reservoir 26 and capable of passing fluids in the internal reservoir 26 to the spout assembly 14 when the spout assembly 14 is properly arranged. The vent tube 56 extends into the internal reservoir 26 below an underside 59 of the lid 13, wherein the underside 59 is a flat plate fixed underneath the lid 13 to provide the lid 13 with a flat lower surface, rather than a lower surface having cavities or contours that could collect liquid when the bottle 10 is inverted.

The spout assembly 14 includes a ball 60 formed with two aligned holes. The ball 60 is generally spherical so that it may pivot within the cylindrical depression 51 and the seat 55 of the insert 54 fit therein. The holes extend entirely through the ball 60. A first hole is a larger bore 61 forming an inlet 62 at a bottom of the ball 60 (when the spout assembly 14 is in the opened position). Proximate the bore 61, and parallel to it, a smaller bore or vent spout 63 is formed through the ball 60. The vent spout 63 has an inlet 64 at a bottom of the ball 60 and an outlet 65 at the top of the ball 60 (again, when the spout assembly 14 is in the opened position).

The spout assembly 14 additionally includes a pour spout 66. The pour spout 66 is a cap over the ball 60 with a cylindrical tube that extends up above the ball 60. In the embodiment shown in these drawings, the pour spout 66 has a slight curve to it, though this is not necessary or critical.

The base of the pour spout 66 is snug fit or affixed within the bore 61 of the ball 60, and the pour spout 66 projects to an opposed outlet 67. The pour spout 66 is much larger than the vent spout 63; the pour spout 66 is longer and also has an inner diameter which is approximately two to four times larger than the inner diameter of the vent spout 63. This allows liquid to pass through the pour spout 66 but not the vent spout 63, without limiting or preventing air or gas from passing through the vent spout 63.

Figure 6A:
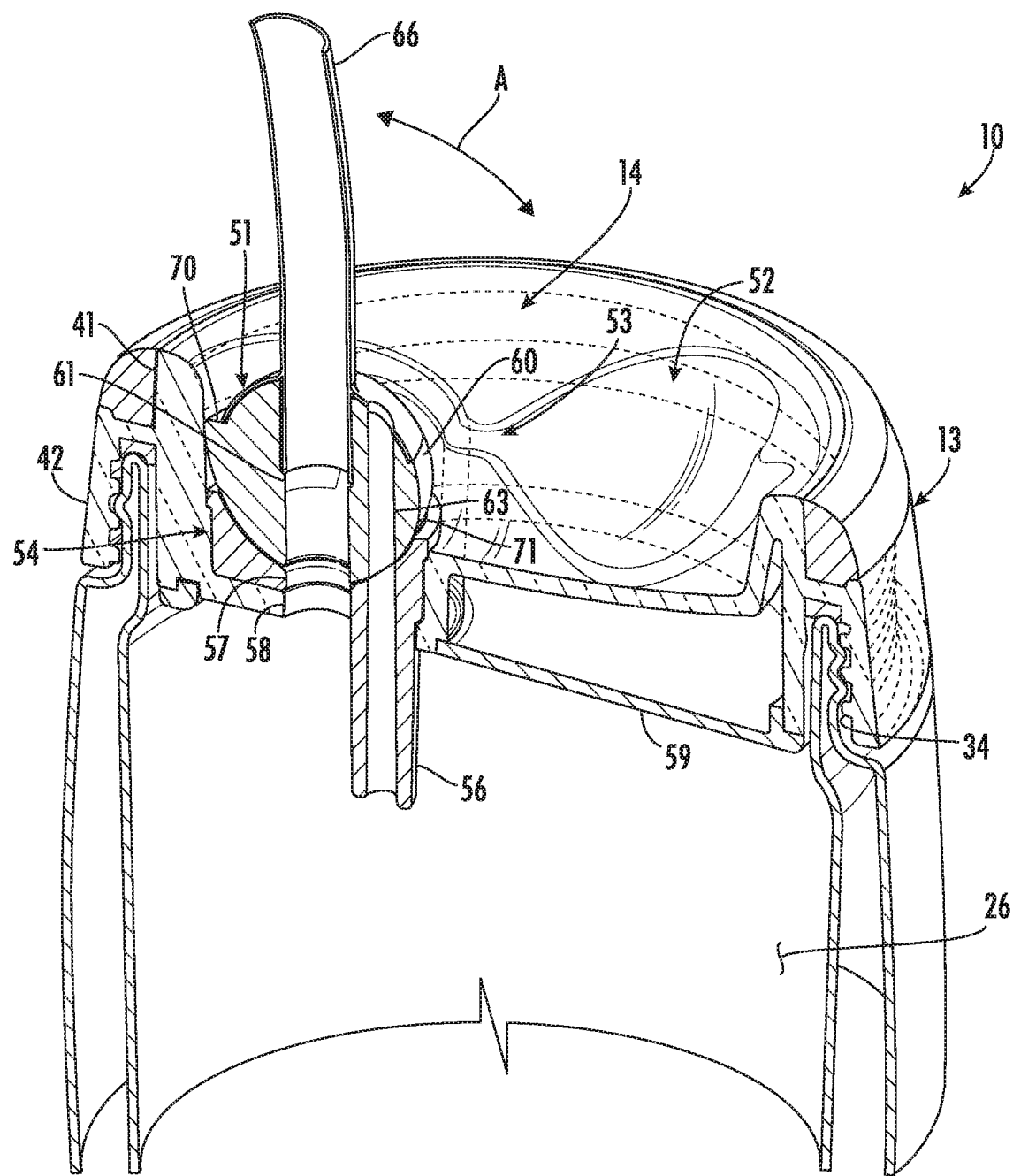
FIGS. 6A and 6B are section views of the multi-compartment bottle of FIG. 1, showing a top of an upper compartment of the bottle, fit with a lid, showing a spout assembly in an opened position and a closed position, respectively.
Figure 6B:
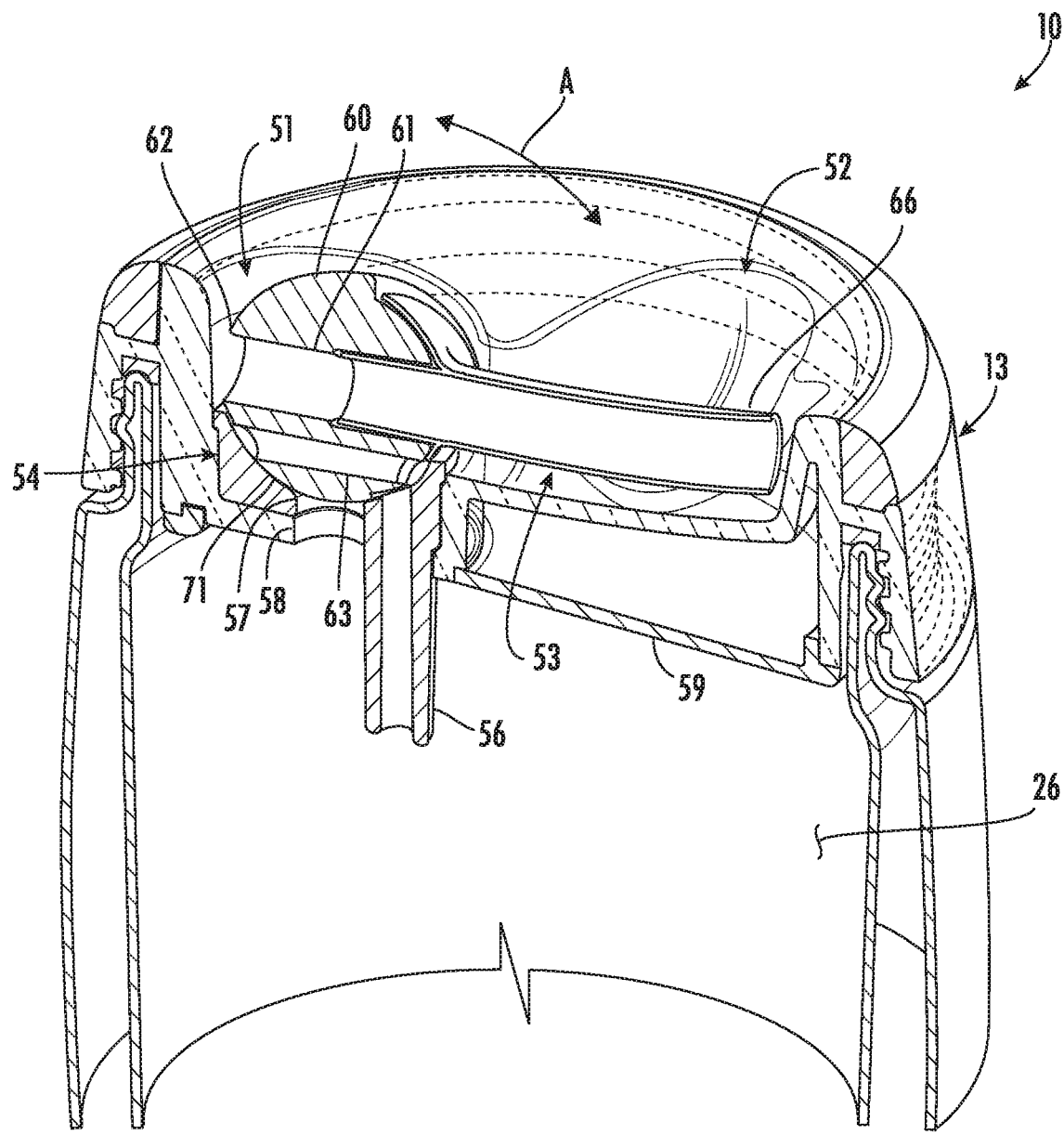

As mentioned above, the spout assembly 14 pivots between the opened position, as shown in FIG. 6A, and the closed position, as shown in FIG. 6B. Turning now to those drawings, in the opened position of the spout assembly 14, the pour spout 66 is aligned or registered in fluid communication with the bores 57 and 58, and the vent spout 63 is aligned or registered in fluid communication with the vent tube 56, and thus both are placed in fluid communication with the internal reservoir 26. The pour spout 66 is raised up, projecting away from the lid 13, so that the bottle 10 can be taken up by hand and titled to dispense the contents of the internal reservoir 26 through the pour spout 66. Gas or air may pass through the vent spout 63 when this occurs, admitting air into the internal reservoir 26 to prevent formation of a vacuum which would otherwise inhibit the flow of liquid out of the internal reservoir 26.

FIG. 6A shows that the ball 60 is not a perfect sphere. The ball 60 includes a projecting lip 70 defined by a locally-enlarged radius of the ball 60. This lip 70 prevents over-rotation of the spout assembly 14 so that it does not pivot past the opened position. As the spout assembly 14 is moved up to the opened position, the enlarged lip 70 confronts the inner sidewall 41. The lip 70 is larger than the space between the ball 60 and the inner sidewall 41, and so the lip 70 eventually prevents the ball 60 from further rotation, at which point the spout assembly 14 is fully raised into the opened position.

The vent tube 56 depends downwardly into the internal reservoir 26. When the spout assembly 14 is in the opened position, the vent spout 63 is arranged in alignment with the vent tube 56, such that a continuous passageway is formed by the vent tube 56 and vent spout 63 allowing for smooth and uninterrupted passage of air therein. The vent tube 56 projects far into the internal reservoir 26 so that, when the bottle 10 is nearly empty and is entirely inverted and liquid is pooled against the underside 59 of the lid 13, the vent tube 56 will not be covered by any liquid still within the internal reservoir 26.

The spout assembly 14 can be pivoted along the double-arrowed arcuate line A in FIG. 6A to the closed position shown in FIG. 6B. In the closed position, the pour spout 66 is down and snugly seated in the channel depression 53, extending through to the oval depression 52. As shown in FIG. 6B, the oval depression 52 flanks the pour spout 66 (FIG. 6B shows one half of the oval depression 52) so that the user can slip a finger into the oval depression 52 and under the pour spout 66 to lift the pour spout 66 when desired. When the spout assembly 14 is moved into the closed position, the pour spout 66 and the vent spout 63 are both closed; the pour spout 66 is moved or aligned out of fluid communication with the bores 57 and 58, and the vent spout 63 is moved or aligned out of fluid communication with the vent tube 56, and so both are no longer in fluid communication with the internal reservoir 26. Moreover, the bores 57 and 58 and the vent tube 56 are actually closed, prevented from passing anything in the internal reservoir 26. A single, continuous, unbroken side 71 of the ball 60 is moved into the bore 57 and over the top of the vent tube 56.

The ball 60 is snug fit within the cylindrical depression 51, and so the interference of the side 71 with the bore 57 and the vent tube 56 seals the bore 57 and the vent tube 56, preventing fluid or other contents of the internal reservoir 26 from escaping and preventing air or gas from entering or escaping the internal reservoir 26. The vent spout 63 and the inlet 62 to the pour spout 66 are both offset away from the bore 57 and the vent tube 56, so that the vent spout 63 and pour spout 66 are moved out of fluid communication with anything. The upper compartment 11 is thus sealed.

Returning to FIGS. 2 and 3, opposite the lid 13, the bottom 23 of the upper compartment 11 includes a reduced-diameter protrusion 80. The protrusion 80 projects downwardly as a continuation of the sidewall 20 of the upper compartment 11, to which it is formed integrally and continuously. The protrusion 80 is offset radially inward from the sidewall 20 by a small, flat, annular shoulder 81 projecting radially inward. The shoulder 81 is located at the bottom 23 of the sidewall 20, and the protrusion depends below this bottom 23. Because the protrusion 80 is radially offset from the sidewall 20, it has a reduced diameter with respect to the sidewall 20 just above the protrusion 80. The protrusion 80 can thus define a base for the upper compartment 11 when the lower compartment 12 is removed therefrom and the upper compartment 11 is stood on its own. The radially-directed outer surface 31 of the protrusion 80 is formed with outwardly-directed threads 82 encircling the protrusion 80 which are complemental to threads 83 formed on the lower compartment 12.

An embodiment of the lower compartment 12 is best shown in FIGS. 2-5. The lower compartment 12 is separate from, separable from, and applicable to the upper compartment 11. The lower compartment 12 has an upstanding wall 90 formed continuously and integrally to a flat base 91. The base 91 opposes an annular open top 92 of the wall 90 which bounds and defines a mouth 93. The wall 90 cooperates with the base 91 and top 92 to define an internal chamber 94 accessible through the mouth 93. The wall 90 is preferably formed of two walls or layers, with an air space disposed between, to provide insulative characteristics to the lower compartment 12.

The lower compartment 12 has an inner surface 95 and an opposed outer surface 96. The inner surface 95 of the lower compartment 12, proximate the top 92, is formed with the inwardly-directed threads 83 which are complemental to the threads 82 on the protrusion 80 and allow the lower compartment 12 to be threadably engaged to the upper compartment 11. In this way, the lower compartment 12 can be carried with the upper compartment 11 as a single unit. When the lower compartment 12 is threadably engaged to the upper compartment 11, the protrusion 80 and the bottom 23 of the upper compartment 11 enclose the internal chamber 94 of the lower compartment 12. Moreover, the upper compartment 11 and the lower compartment 12 each have tapering outer diameters B and C along their respective outer surfaces 31 and 96, as shown in FIG. 1, and when they are applied to each other, their outer surfaces 31 and 96 and their outer diameters B and C are contiguous to each other, such that the bottle 10 presents a substantially contiguous and continuous appearance with only a small seam line between the upper and lower compartments 11 and 12.

Not only can the lower compartment 12 be carried together with the upper compartment 11, but the lower compartment 12 can contain and carry other items. The lower compartment 12 includes engagement structures 100 which define a hold 101 within the lower compartment 12 to carry such items. In the embodiments shown in these drawings, the engagement structures 100 are four inwardly-directed ribs 102, but in other embodiments, the may be other structures, such as fingers, springs, leaf springs, helical supports, and the like. The ribs 102 surround the hold 101 on four sides; the hold 101 is generally a cylindrical space, open at its top proximate the top 92, and closed at its bottom proximate the base 91. The hold extends between the ribs 102, which are shown and described here.

Figure 4:
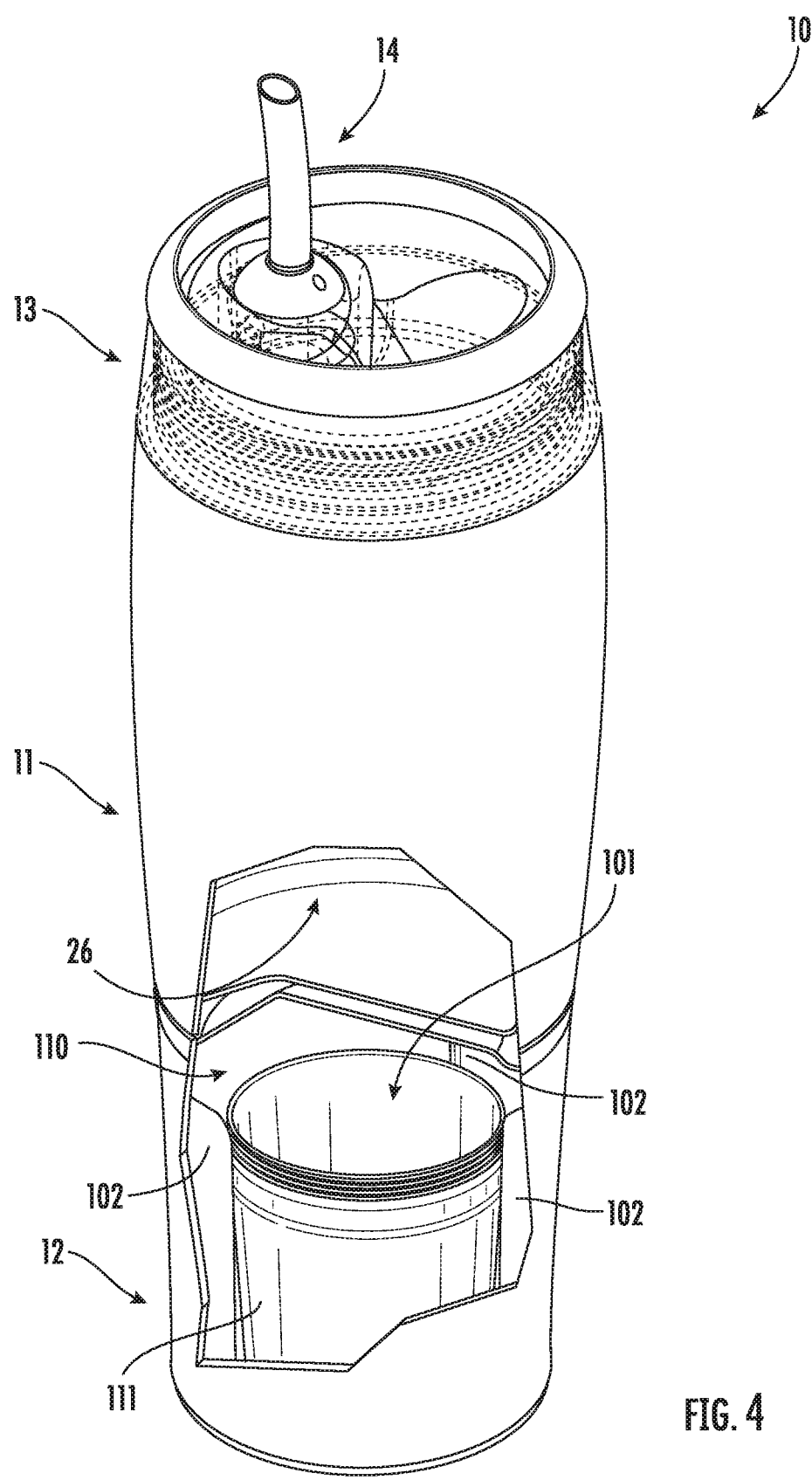
FIG. 4 is a partially eroded view of the multi-compartment bottle of FIG. 1.
Figure 5:
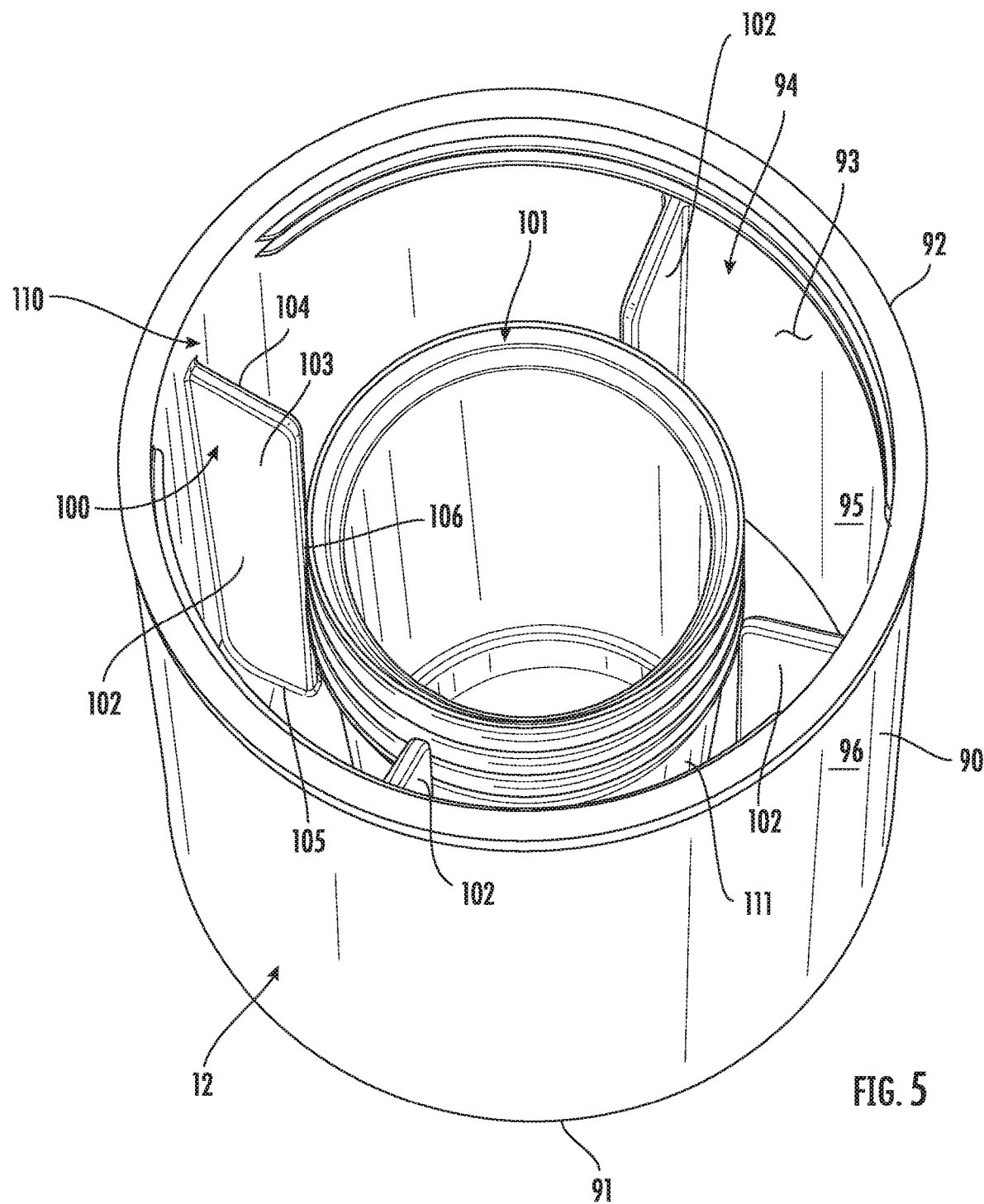
FIG. 5 is a top perspective of a lower compartment of the multi-compartment bottle of FIG. 1.

Four ribs 102 extend radially inwardly from the wall 90; two ribs 102 can be seen in FIG. 2, three ribs 102 can be seen in FIGS. 3 and 4, and all four ribs 102 can be seen in FIG. 5. In other embodiments, there may be a fewer or greater number of ribs 102. All of the ribs 102 are identical but for their circumferentially-spaced apart locations on the wall 90, and so only one rib 102 will be described with the understanding that the description applies equally to all the ribs 102. The rib 102 has a body 103 with a top 104, an opposed bottom 105, and an inward edge 106 extending along the top 104 and down the body 103 to the bottom 105. The body 103 is straight, flat, and thin, projecting along a radius from the inner surface 95 of the wall 90 to a geometric central axis of the lower compartment 12.

The top 104 of the rib 102 is recessed below the open top 92 of the lower compartment 12. Since all of the tops 104 of the ribs 102 are recessed, this defines a shallow space or shallow seat 110. The seat 110 is defined between the tops 104 of the ribs 102, the inner surface 95 of the wall 90, and the mouth 93 at the open top 92 of the lower compartment 12. The seat is a shallow, disc-shaped space, wider than it is deep, and configured to closely receive the protrusion 80. Indeed, when the upper and lower compartments 11 and 12 are applied to each other, the protrusion 80 fits into the seat 110.

The ribs 102 snugly hold an item applied to the hold 101. The inward edge 106 of each rib 102 is oriented slightly inwardly from the top 104 to the bottom 105. In other words, the inward edge 106 is slightly closer to the wall 90 proximate the top 104 of the rib 102 than it is proximate to the bottom 105 of the rib 102, such that a diameter of the hold 101 tapers or reduces from the top 92 to the base 91 of the lower compartment 12. This allows items to be press-fit down into the hold 101 and thus snugly secured therein.

FIGS. 2-5 show a small cup 111 fit into the hold 101. The cup 111 is approximately the size of a two-ounce shot glass, but may be of different sizes. The cup 111 is pressed into the hold 101, between the ribs 102, and securely retained there, such that it will not inadvertently come loose. While FIGS. 2 and 3 show a single cup 111 applied to the hold 101, FIGS. 4 and 5 show several cups 111 nested or stacked in each other and applied to the hold 101. In this way, several cups 111 can be carried with the bottle 10, so that a foursome can drink the contents of the bottle 10 without sharing germs.

In use, such as during a golf outing, a golfer in a foursome will pre-fill the internal reservoir 26 with a liquid, such as water, lemonade, or alcohol. He fills the internal reservoir 26 by removing the lid 13 and pouring the desired liquid through the mouth 21. He then replaces the lid 13, threadably engaging it with the upper compartment 11 and tightening until the gaskets 33 form a seal between the lid 13 and the upper compartment 12. The golfer places one, two, three, four, or more cups 111 within the hold 101, and then threadably engages the lower compartment 12 on the bottom 23 of the upper compartment 11. The golfer moves the spout assembly 14 into the lowered, closed position, and the bottle 10 is ready to be taken with him on the golf course. In between holes, the golfers may decide to have a drink. To do so, they remove the lower compartment 12 from the upper compartment 11 and each golfer takes his cup 111 from the hold 101. With each golfer holding a single cup 111, one of them moves the spout assembly 14 to the opened position and dispenses the liquid to each cup 111. Each golfer gets his fill, and when the golfing party is ready to move, they nest their cups 111, return the nested cups 111 to the hold 101 in snug retention, screw the lower compartment 12 onto the upper compartment 11, and move the spout assembly 14 to the closed position. The bottle 10 is then ready to be transported without concern that the liquid contents will leak out.

Figure 7A:
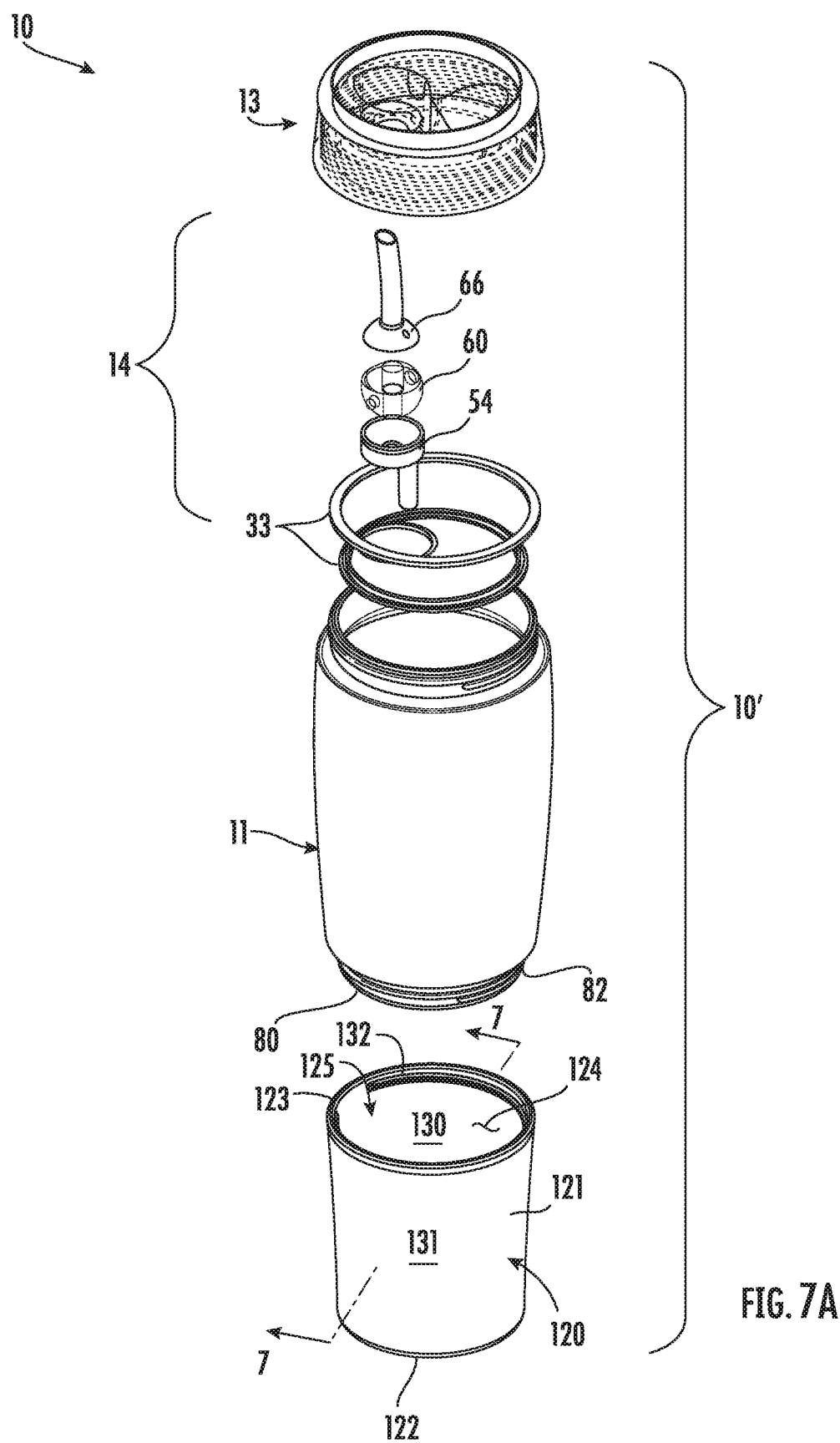
FIG. 7A is an exploded view of a multi-compartment bottle.
Figure 7B:
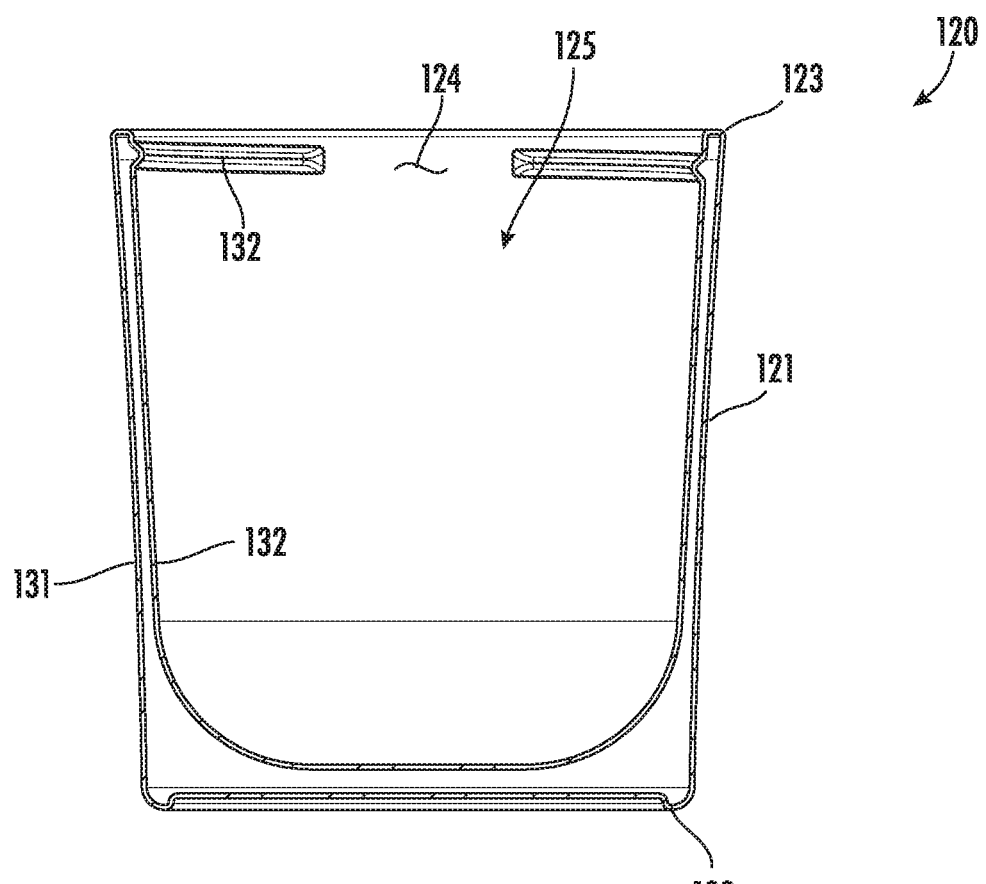
FIG. 7B is a section view of a lower compartment of the multi-compartment bottle of FIG. 7A, taken along the line 7-7 in FIG. 7A.

FIGS. 7A and 7B show an alternate embodiment of the lower compartment 12, identified as a lower compartment 120 of a bottle 10'. The bottle 10' is identical to the bottle 10 but for replacement of the lower compartment 12 with the lower compartment 120. All of other elements of the bottle 10'—the upper compartment 11, the lid 13, etc.—are identical to the bottle 10 and so are not described herein. Indeed, because such parts are identical to corresponding parts in the bottle 10, the same reference characters are used in the drawings to indicate that such parts are identical.

The lower compartment 120 is a tumbler. The lower compartment 120 is separate from, separable from, and applicable to the upper compartment 11. The lower compartment 120 has an upstanding wall 121 formed continuously and integrally to a flat base 122. The base 122 opposed an annular open top 123 of the wall 121 which bounds and defines a mouth 124. The wall 121 cooperates with the base 122 and top 123 to define an internal chamber 125 accessible through the mouth 124. The wall 121 is preferably formed of two walls or layers, with an air space disposed between, to provide insulative characteristics to the lower compartment 120.

The lower compartment 120 has an inner surface 130 and an opposed outer surface 131. The inner surface 130 of the lower compartment 120, proximate the top 123, is formed with inwardly-directed threads 132 which are complemental to the threads 82 on the protrusion 80 and which allow the lower compartment 120 to be threadably engaged to the upper compartment 11. In this way, the lower compartment 120 can be carried with the upper compartment 11 as a single unit. The remainder of the inner surface 130 is smooth, without discontinuities or irregularities. The lower compartment 120 is therefore suitable for use as a drinking tumbler, and the golfers may dispense the contents of the internal reservoir 26 directly into the lower compartment 120 when they take this bottle 10' on the golf course with them.

A preferred embodiment is fully and clearly described above so as to enable one having skill in the art to understand, make, and use the same. Those skilled in the art will recognize that modifications may be made to the description above without departing from the spirit of the invention, and that some embodiments include only those elements and features described, or a subset thereof. To the extent that modifications do not depart from the spirit of the invention, they are intended to be included within the scope thereof.

The invention claimed is:

1. A multi-compartment bottle comprising:
    an upper compartment having a bottom, an open mouth opposite the bottom, and a sidewall cooperating with the bottom to bound an internal reservoir, wherein a lid is fit to the open mouth to enclose the internal reservoir;
    a lower compartment separate from the upper compartment, having a base, an open top opposite the base, and a wall cooperating with the base to bound an internal chamber, wherein the bottom of the upper compartment is applicable to the open top of the lower compartment to enclose the internal chamber; and
    the lower compartment includes engagement structures which extend into the internal chamber from the wall to define a hold in the lower compartment;
    wherein the engagement structures are ribs, and each rib has a top which is recessed below the open top of the lower compartment, thereby defining a shallow seat between the tops of the ribs, an inner surface of the wall, and the open top of the lower compartment; and
    the bottom of the upper compartment includes a reduced-diameter protrusion which fits into the seat when the bottom of the upper compartment is applied to the open top of the lower compartment.

2. The multi-compartment bottle of claim 1, wherein the ribs extend radially inward from the wall.

3. The multi-compartment bottle of claim 1, wherein each rib has a top, an opposed bottom, and an inward edge which is oriented slightly inwardly from the top to the bottom of the rib.

4. The multi-compartment bottle of claim 1, wherein the inner surface of the wall is formed with internally-directed threads, and the protrusion is formed with complemental outwardly-directed threads.

5. The multi-compartment bottle of claim 1, wherein the upper compartment and the lower compartment each have tapering outer diameters, which, when the upper compartment is applied to the lower compartment, are contiguous to each other.

6. The multi-compartment bottle of claim 1, wherein the lid comprises a spout assembly including a pour spout and a vent spout, wherein the spout assembly moves between a closed position, in which the pour spout and vent spout are both closed, and an open position, in which the pour spout and vent spout are both opened.

7. A multi-compartment bottle comprising:
    an upper compartment having a bottom, an open mouth opposite the bottom, and a sidewall cooperating with the bottom to bound an internal reservoir, wherein a lid is fit to the open mouth to enclose the internal reservoir;
    a lower compartment separate from the upper compartment, having a base, an open top opposite the base, and a wall cooperating with the base to bound an internal chamber, wherein the bottom of the upper compartment is applicable to the top of the lower compartment to enclose the internal chamber; and
    the lower compartment includes inwardly-directed ribs which extend into the internal chamber from the wall to define a hold in the lower compartment;
    wherein each rib has a top which is recessed below the open top of the lower compartment, thereby defining a shallow seat between the tops of the ribs, an inner surface of the wall, and the open top of the lower compartment; and
    the bottom of the upper compartment includes a reduced-diameter protrusion which fits into the seat when the bottom of the upper compartment is applied to the open top of the lower compartment.

8. The multi-compartment bottle of claim 7, wherein the ribs extend radially inward from the wall.

9. The multi-compartment bottle of claim 7, wherein each rib has a top, an opposed bottom, and an inward edge which is oriented slightly inwardly from the top to the bottom of the rib.

10. The multi-compartment bottle of claim 7, wherein the inner surface of the wall is formed with internally-directed threads, and the protrusion is formed with complemental outwardly-directed threads.

11. The multi-compartment bottle of claim 7, wherein the upper compartment and the lower compartment each have tapering outer diameters, which, when the upper compartment is applied to the lower compartment, are contiguous to each other.

12. The multi-compartment bottle of claim 7, wherein the lid comprises a spout assembly including a pour spout and a vent spout, wherein the spout assembly moves between a closed position, in which the pour spout and vent spout are both closed, and an open position, in which the pour spout and vent spout are both opened.

13. A multi-compartment bottle comprising:
an upper compartment having a bottom, an open mouth opposite the bottom, and a sidewall cooperating with the bottom to bound an internal reservoir;
a lower compartment separate from the upper compartment, having a base, an open top opposite the base, a wall cooperating with the base to bound an internal chamber, and engagement structures which extend into the internal chamber from the wall to define a hold in the lower compartment, wherein the bottom of the upper compartment is applicable to the top of the lower compartment to enclose the internal chamber;
each rib has a top which is recessed below the open top of the lower compartment, thereby defining a shallow seat between the tops of the ribs, an inner surface of the wall, and the open top of the lower compartment, and the bottom of the upper compartment includes a reduced-diameter protrusion which fits into the seat when the bottom of the upper compartment is applied to the open top of the lower compartment; and
a lid is fit to the open mouth of the upper compartment to enclose the internal reservoir, the lid comprising a spout assembly including a pour spout and a vent spout, wherein the spout assembly moves between a closed position, in which the pour spout and vent spout are both closed, and an open position, in which the pour spout and vent spout are both opened.

14. The multi-compartment bottle of claim 13, wherein:
the lid includes a bore and a vent tube, each coupled in fluid communication with the internal reservoir when the lid is applied to the upper compartment;
in the closed position of the spout assembly, the pour spout is aligned into fluid communication with the bore and the vent spout is aligned into fluid communication with the vent tube; and
in the opened position of the spout assembly, the pour spout is aligned out of fluid communication with the bore and the vent spout is aligned out of fluid communication with the vent tube.

15. The multi-compartment bottle of claim 13, wherein the ribs extend radially inward from the wall.

16. The multi-compartment bottle of claim 13, wherein each rib has a top, an opposed bottom, and an inward edge which is oriented slightly inwardly from the top to the bottom of the rib.

17. The multi-compartment bottle of claim 13, wherein the inner surface of the wall is formed with internally-directed threads, and the protrusion is formed with complemental outwardly-directed threads.

18. The multi-compartment bottle of claim 13, wherein the upper compartment and the lower compartment each have tapering outer diameters, which, when the upper compartment is applied to the lower compartment, are contiguous to each other.

* * * * *